United States Patent [19]
Marmorstein et al.

[11] Patent Number: 5,337,825
[45] Date of Patent: Aug. 16, 1994

[54] METHOD OF OIL WELL PRODUCTIVITY INCREASE

[75] Inventors: Leon M. Marmorstein, San Francisco, Calif.; Ignaty M. Petuhov, Sankt-Petersburg, U.S.S.R.; Vladimir S. Sidorov, Leningrad Oblast, U.S.S.R.; Piotr A. Aleksandrov, Sankt-Petersburg, U.S.S.R.; Valentin T. Grebennikov, Moscow, U.S.S.R.

[73] Assignee: UMA Ltd., St. Petersburg, Russian Federation

[21] Appl. No.: 72,454

[22] Filed: Jun. 7, 1993

[30] Foreign Application Priority Data

Sep. 9, 1992 [SU] U.S.S.R. .................. 5067255

[51] Int. Cl.$^5$ .................. E21B 43/27; E21B 43/26; E21B 43/22; E21B 43/114
[52] U.S. Cl. .................. 166/307; 166/298; 166/300
[58] Field of Search .................. 166/307, 298, 55, 55.1, 166/222, 223, 270, 300, 305.1; 299/17

[56] References Cited

U.S. PATENT DOCUMENTS

| | | | |
|---|---|---|---|
| 2,315,496 | 4/1943 | Boynton | 166/298 X |
| 3,215,199 | 11/1965 | Dilgren | 166/300 X |
| 3,342,262 | 9/1967 | King et al. | 166/300 X |
| 3,393,736 | 7/1968 | Goodwin | 166/298 |
| 3,605,889 | 9/1971 | Closmann et al. | 166/254 |
| 3,827,495 | 8/1974 | Reed | 166/250 |
| 4,047,569 | 9/1977 | Tagirov et al. | 166/308 |
| 4,109,721 | 8/1978 | Slusser | 166/280 |
| 4,134,453 | 1/1979 | Love et al. | 166/298 |
| 4,186,802 | 2/1980 | Perlman | 166/280 |
| 4,346,761 | 8/1982 | Skinner | 166/206 |
| 4,703,803 | 11/1987 | Blumer | 166/307 X |
| 4,733,727 | 3/1988 | Falls | 166/275 X |
| 4,762,178 | 8/1988 | Falls et al. | 166/268 |
| 4,787,456 | 11/1988 | Jennings, Jr. et al. | 166/299 |
| 4,917,186 | 4/1990 | Mumalla | 166/300 X |

FOREIGN PATENT DOCUMENTS

| | | |
|---|---|---|
| 1373796 | 2/1988 | U.S.S.R. . |
| 1411441 | 7/1988 | U.S.S.R. . |
| 1476111 | 4/1989 | U.S.S.R. . |
| 1477252 | 4/1989 | U.S.S.R. . |
| 1505959 | 9/1989 | U.S.S.R. . |

OTHER PUBLICATIONS

Sidorovskii, "Opening of Seams and Productivity Increase of Well", Nedra, Moskow, 1978, p. 111. (copy in application).

Masszi, "Cavity Stress-Relief Method for Recovering Methane from Coal Seams", Rocky Mountain Assoc. of Geologists, 1991, pp. 149-154.

*Primary Examiner*—Stephen J. Novosad
*Attorney, Agent, or Firm*—Ilya Zborovsky

[57] ABSTRACT

Oil wells productivity is increased by cyclically treating a shaft-adjacent zone of the well with a seam-forming liquid which contains additional activating components.

17 Claims, 4 Drawing Sheets

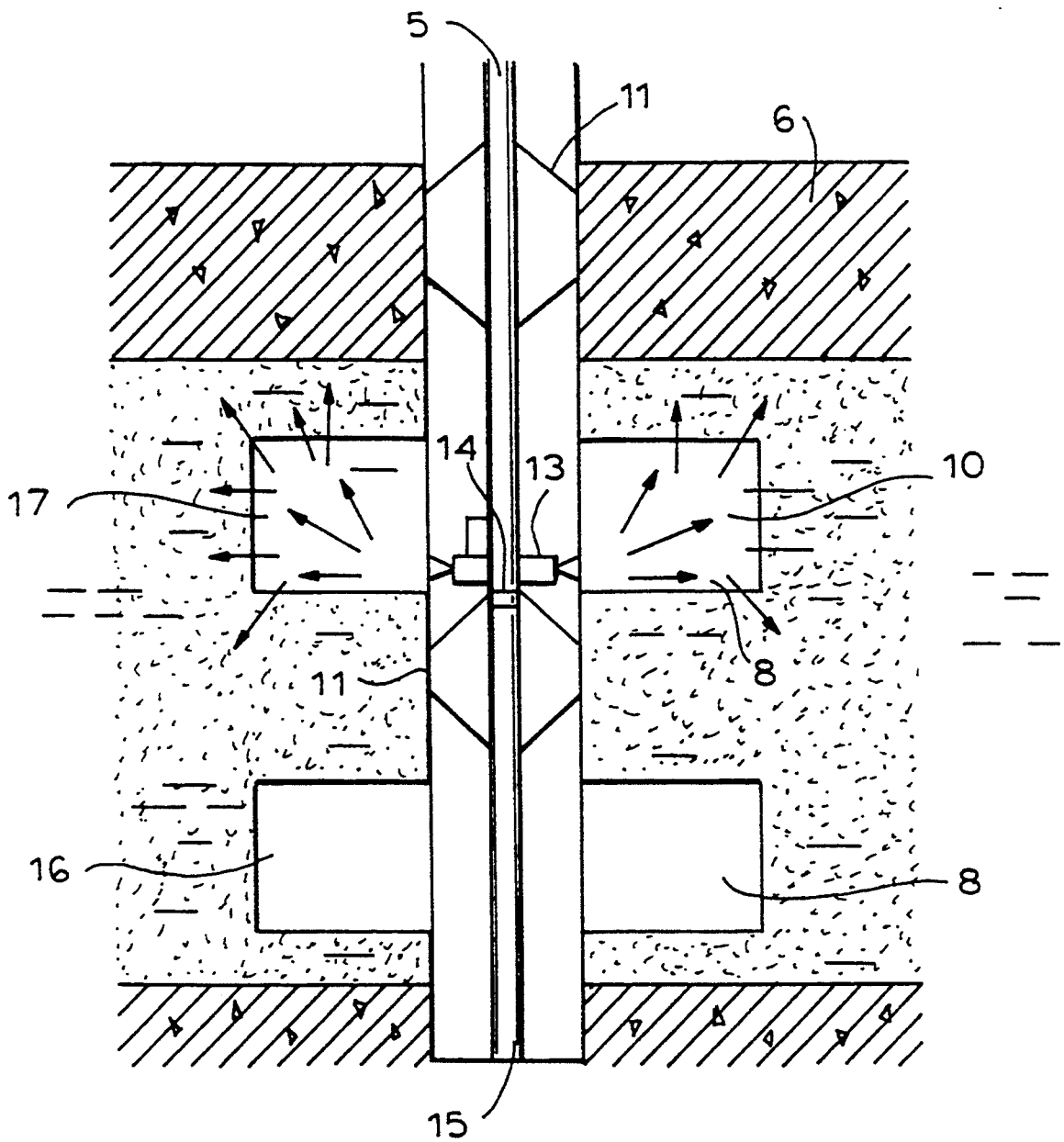
F I G. 4

METHOD OF OIL WELL PRODUCTIVITY INCREASE

BACKGROUND OF THE INVENTION

The present invention relates to a method of increasing oil well productivity, by acting on a zone which is near a well.

It is known that the permeability of the near well zone has a decisive influence on its productivity. This zone is in the most stressed condition as for the specific quantity of extraction product which passes through it, and mechanical compression stresses. One of the very important problems in this field is to increase its permeability and reduce sressed in the near well zone.

Known methods of the use of seam-forming reactants are based on dissolving and removal from the near well zone of a part of rock, for example by treatment of carbonate collectors etc. This is disclosed in U.S. Pat. Nos. 4,733,727, 4,703,803, 4,604,218, British patent 2 167 470, and Soviet Inventor's certificates 1 411 441 and 1 476 111. The common disadvantage of these methods is violation of strength of the structure of a new space, which can lead to fast reduction of oil filtration in the seam, and also impossibility of prevention of swelling of minerals of montmorillonite group clays, for example bentonite clays.

A method of hydraulic fracturing of productive seams for forming horizontal cracks is disclosed in U.S. Pat. No. 3,965,982. In accordance with this method, upper and lower packers are installed in the well against the seam, to form contact with the exposed surface of the seam. In accordance with another method disclosed in U.S. Pat. No. 3,976,138, the permeability of productive seams is increased by introduction into the seam treating liquid of aluminous loosening agent. In accordance with still another method disclosed in U.S. Pat. No. 4,007,792 hydraulic fracturing of productive seams is obtained with the use of viscous solutions of surface-active substances. In this method the pressure in the well is increased to the value, at which the cracks in rock are formed, and the pressure is maintained for 0.5-6 hours. Then the pressure is reduced, and the well is emptied.

A method of multiple fracturing of underground seams is known, in which in order to rupture the seam which is opened by the well the working liquid is pumped through the well into the seam and then particulate loosening material is introduced into the cracks. After this, the working liquid is pumped into the well for a next fracturing of the seam, and the particulate loosening materials is introduced into the new crack, as disclosed in U.S. Pat. No. 3,998,271.

It is also known to loosen the cracks in productive seams by introducing a viscous liquid so that it fills the cracks and is retained in them. Then the introduction of liquid is stopped and the crack is left open till the liquid is hardened and loosens the crack, as disclosed in U.S. Pat. No. 4,029,149. Finally, the productive seams can be ruptured by an acid foam. In this method a gel-like solution which contains surface-active substances and inert gas for forming cracks in the seam are introduced into the seam with a sufficient pressure as disclosed in U.S. Pat. No. 4,044,833.

The above described methods are based on formation of hydraulic connection of the productive seam or group of seams with the well through a low-permeability zone or practically impermeable zone which is near to the well and is characterized by increased concentration of stresses. However, when rock is not excavated and no gap-like cavities are formed, no unloading zone in the near well zone will be formed.

The proposal which is the closest to the present invention is disclosed in the publication "Opening of Seams and productivity increase of well", by V.A. Sidorovskii, in "Nedra" Moscow, 1978, page 111. It includes cyclic treatment of the near well zone with seam-treating reactant which is an acid solution. This method has almost universal action on the near well zone, provides productivity increase of wells, their yield, and straightens the profile of advancement of water pumped into the well to maintain the seam pressure. However, this method has a low efficiency for terigen aluminous seams, in which the process is impeded by swelling and peptization of aluminous particles.

SUMMARY OF THE INVENTION

Accordingly, it is an object of the present invention to provide a method of oil well productivity increase, which avoids the disadvantages of the prior art.

In keeping with these objects and with others which will become apparent hereinafter, one feature of the present invention resides, briefly stated in the method of oil well productivity increase which includes cyclic treatment of the near well zone with a seam-treating liquid and control of permeability of channels of the zone, in which in accordance with the invention a seam-treating liquid with alkali base is utilized, and during or before use it is activated by additional ingredients.

When the method is performed in accordance with the present invention, the oil well productivity is increased. At the same time swelling and peptization of aluminous particles is prevented. The channels of the near well zone are increased. The consumption of activating components in the seam-treating liquid is reduced. The time of treatment of the near well zone is reduced. An additional productivity increase of treatment is obtained by combining of several treatment methods. Also, additional reduction of mechanical stresses in the near well zone and increase of the area of permeability surface are achieved.

In order to prevent swelling and peptization of aluminous particles by forming links between them, which $K^+$ which is a component causing phase transition of third order in aluminous materials of the group 2:1, and polyvalent cations for example $Al^{3+}$, $Mg^{2+}$ are introduced into the seam-forming liquid.

For increasing the size of the channels, it is possible to use sodium bicarbonate activated by gas, for example carbon dioxide.

For reducing of liquid consumption and consumption of activating components, in addition to the control of permeability of zone channels, a control of linking (binding) of aluminous particles is performed. It can be made by evaluating a difference of concentration of pH and cations in the seam-treating liquid which enters and exits the well.

In order to reduce the time of treatment, the end of treatment for linking of all aluminous particles, preventing of their swelling and peptization ( narrowing of zone channels), can be determined by the above difference of concentration reaching not more than 5%.

Moreover, in order to increase the efficiency, the treatment of the near well zone with the seam-treating liquid can be performed simultaneously with slot loosening of the well by using the seam-treating liquid as a working liquid.

Moreover, for additional permeability increase, stress reduction of the near well zone and increase of the area of permeability surface in the well a second pair of vertical slots can be formed and located symmetrically relative to the well and perpendicularly to the first pair of slots, with the depth of the second pair of slots equal to 20–50% of the depth of the first pair of slots.

The method in accordance with the present invention provides for high efficiency treatment of terigen aluminous (loami) seams, washing out of deposits which clog filtering systems, and recreation of filtering properties of the zone and their stabilization, and it contributes to reduction of stresses of the near well zone. It should be emphasized that the formation of a stationary loosening zone is important in the inventive method since only the formation of this zone leads not only to formation of hydraulic connection of the well with the productive seam, but also to the sharp increase of filtration properties of the productive seam in the near well zone.

The novel features of the present invention are set forth in particular in the appended claims. The invention itself, however, both as to its construction and its method, will be best understood from the following description of preferred embodiments which is accompanied by the following drawings.

BRIEF DESCRIPTION OF THE DRAWINGS

FIGS. 3 and 4 are views illustrating the results of treatment of an interval with a seam-treating liquid containing activating components during the process of its intensification by slot forming, for example a temporary isolation of intervals lying above and below, for example by a packer at the end of slot forming when the seam-treating liquid is pumped into the seam.

DESCRIPTION OF PREFERRED EMBODIMENTS

Figure 1A:
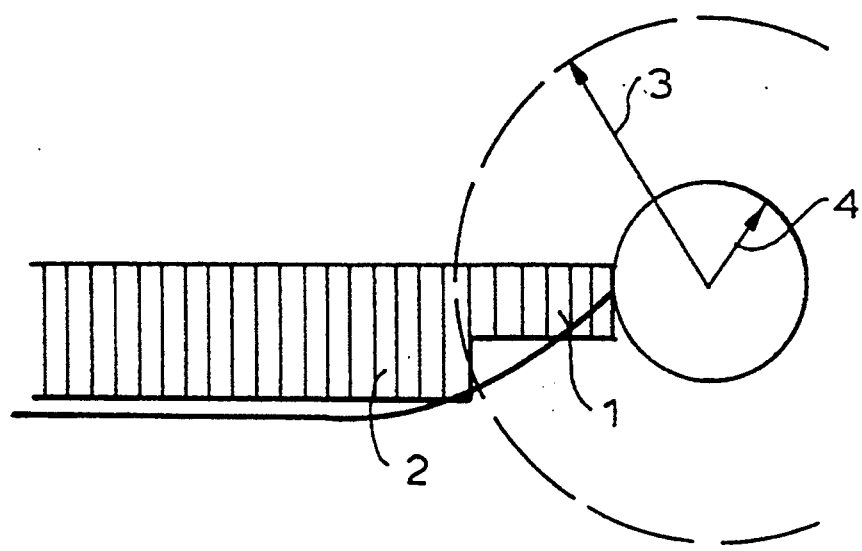
FIG. 1 illustrates a change of permeability in a near well zone as a result of slot forming in a seam.

The method of the present invention is illustrated in the drawings, in which permeabilities of a near well zone and of a productive seam are 1 and 2, radii of the near well zone and of a well bore are 3 and 4, and pump-compressor pipes are 5. Impermeable rocks and rocks of the productive seam are identified as 6 and 7, vertical slots are 8, a filtering column for pumping of a seam-treating solution is 9, a direction of pumping of the seam-forming solution is 10, a compression packer is 11, low permeable rocks of the productive seam are 12, a sand-jet perforator is 13, a plug is 14, a shank is 15, a treated slot is 16, and a treating interval is 17.

The method in accordance with the present invention is performed in the following manner. The goal for example is to increase the productivity of a well with aluminous seams. A seam-treating liquid is selected, which is a low alkaline solution of activating reactants a low alkaline solution is a solution which is a weak alkali or in other words has a low pH, for example from 4.5 to 8.5.

An Example 1 of the seam-treating liquid is utilized for a terrigen collector with clay montmorellonite cements and is a water solution including KCl-7.5 kg/m$^3$;
KOH-5.6 kg/m$^3$;
MgCl$_2$-300 kg/m$^3$;
CMC-600-20 kg/m$^3$;
Disolvant-6 kg/m$^3$;
Tonite-4 kg/m$^3$.

The pH of this solution is 8.2–8.5.

A second example is utilized for a terrigen collector with clay cements of the group caolinites or hydromica and is a water solution including KOH-6 kg/m$^3$;
MgCl$_2$-320 kg/m$^3$;
CMC-600-20 kg/m$^3$;
Disolvant-6 kg/m$^3$;
Tonite-4 kg/m$^3$; and
AlCl$_3$-5 kg/m$^3$ The pH of this solution is approximately 8.5.

A third example is utilized for a terrigan collector with clay cements and secondary harmonization and is a water solution including components of the first two examples but in which KOH is replaced with hydrochloric acid.

The pH of this solution is between 4.5 and 5.0.

After preparation of each solution, a sand, for example a quartz sand is added with the grain size 0.2–1 mm with quartz content not less than 50%. The concentration of the sand is 50–100 g/l. The volume of the solution for pressing (pumping) into the shaft-adjacent zone of the seam is determined as $V_p = V_c \times n$, wherein $V_c$ is a volume of a cylindrical column in the vicinity of the well which is to be preliminarily treated, n is a porosity of the rock of the seam collector. Here $V_c = \pi(r^2 - r^2_c) \times m$, wherein r is a preliminarily determined experimentally, a radius of consolidation around the well:
$r_c$ is a radius of the well bore:
m is a thickness of the seam.

Activating components are added into a vessel with the seam-treating liquid before the treatment of the seam, and are thoroughly mixed. The activating components are K+ which is a reactant causing a phase transition of third order in aluminous materials of the group 2:1, and Al$^{3+}$ which is a polyvalent cation.

The dose of the liquid calculated above, with the activating components is pressed by a compressor which produces a pressure of substantially 700 atm, into the near well zone. During this process the phase transition of the third order takes place in aluminous materials which remained in the channels of rock of the zone, links are formed therebetween and prevent their swelling and peptization. This substantially increases the degree of cleaning of the channels of the rock during treatment and the time of maintainance of the cleaned channels during use.

The optimization of the initial concentration of pH and cations in the seam-treating liquid is performed experimentally on the samples of the core of the well which is being treated. This is done in accordance with the same criterion. Usually it is a few percentages. Cylindrical samples are bored from the core taken by a core taking device. They are fixed in in a core-holder of a device for measuring a value of filtration. Several samples of the seam-treating liquid with different valves of pH, usually 7.8–8.5 with an interval of 0.3 and the concentration of salts preliminarily evaluated in accordance with a standard analysis of mineral composition of the core, are prepared.

In accordance with another approach, sodium bicarbonate is used as a seam-treating liquid, or in particular its saturated solution. After the determination of volume of liquid which is needed for pumping into the near well zone, the liquid is saturated with gas, for example carbon dioxide. The well is treated with the gas-saturated liquid in the same way as before. Dissolution of the seam cement and the rock itself takes place. When the dissolved mass is withdrawn, the density of the rock is reduced, as well as the stresses which act in this zone and can be controlled by geophysical experimental methods, for example electrometric, ultrasonic, flat gamma logging, and other methods.

Since the dissolution property of sodium bicarbonate is determined by thermobaric conditions, therefore when the activating liquid gets into the rock the efficiency of its opening is increased. In other words, the size of channels of the rock in the zone is increased due to the reduction of the density of the jet and due to the discharging gas. This approach also increases the efficiency of treatment.

In addition to the control of the permeability of the channels, also the control of linking of the aluminous particles is performed. The latter control is performed by comparing the concentration of pH and cations in the seam-forming liquid before and after the treatment of the well. The confirmation of the fact that all aluminous particles are linked is the absence of difference between the above mentioned concentrations. At this point no pH and cations are consumed from the liquid. Practically it is sufficient to obtain the concentration difference which does not exceed 5%.

The third modification of the inventive method differs from the first two in that, the prepared activated liquid is not pressed through the near well zone of the seam, but it is used as a working liquid of a hydro-perforator. In other words, sand is added to it, and its volume is determined by the demands for perforation. This reduces the time of treatment and increases the efficiency of treatment. However, the consumption of the working liquid which is at the same time the seam-treating liquid, is increased.

The fourth embodiment of the inventive method includes, simultaneously with the seam-treatment, also an additional mechanical unloading (loosening) of the near well zone and increase of the area of permeability of the well. Two pairs of vertical slots (kerfs) which are symmetrical relative to the well are formed in the well. The slots of the first pair must have the length in a vertical direction which is no less that 4 diameters of the well, and the width in a horizontal direction which is not less that 15 mm. The second pair is arranged perpendicularly to the first pair and its slots have the depth in a horizontal direction equal to 20–50% of the depth of the first pair of slots. The concentration of mechanical stresses in this case is displaced from the near well zone of the well to the distant ends of the first pair of slots. The second pair of slots additionally increases the area of permeability formed during loosening caused by the first pair of slots, also due to opening of crack formations in the rock of the well. The increase of the length of the second slots above the above mentioned limit leads them to the zone of increased stresses and narrows the region of unloaded rocks, and therefore reduces free access of the product of seam to the well, while the reduction of the length reduces the area of additional permeability of the well.

Minimum permissible length of the slot is determined analytically and experimentally, based on a guaranteed non-closing of its walls.

The width of the slot required for unloading (loosening) of the rocks is determined from the following:

$$t = 1.6 \frac{\gamma H}{E} \times a,$$

wherein $\gamma H$ is a rock pressure at the depth H, E is a modulus of elasticity of the rock, $a = 2L + d$ which is a total size of the well and two slots.

The value a is fixed: $a \cong 9d = 1800$ mm. Maximum value of the ratio $$\frac{\gamma H}{E}$$

for the depths $H = 2–5$ km will be substantially 0.005. At the lower depth this ratio will be lower. Therefore assuming that $$\frac{\gamma H}{E} = 0.005,$$

then $$t_{max} = 1.6 \times 0.005 \times 1800 \cong 15 \text{ mm.}$$

This depth is sufficient for loosening of rocks, since no complete closing of the crack occurs. Moreover, during further increase of the width of the slot no increase in the efficiency of loosening takes place.

The table below shows values of coefficient of concentration of stresses, depending on the ratio of the depth of slot L to the diameter of the well d. From analysis of data in the table it can be seen that, with the error of less than 2%, it can be said that increase of the depth of each slot more than 4 diameter values practically does not lead to reduction of the coefficient of concentration of stresses.

| L/D | 0 | 2 | 4 | 6 | 10 |
|---|---|---|---|---|---|
| $2l = \frac{\sigma}{\gamma H}$ | 2.00 | 1.20 | 1.12 | 1.11 | 1.10 |

Figure 1B:
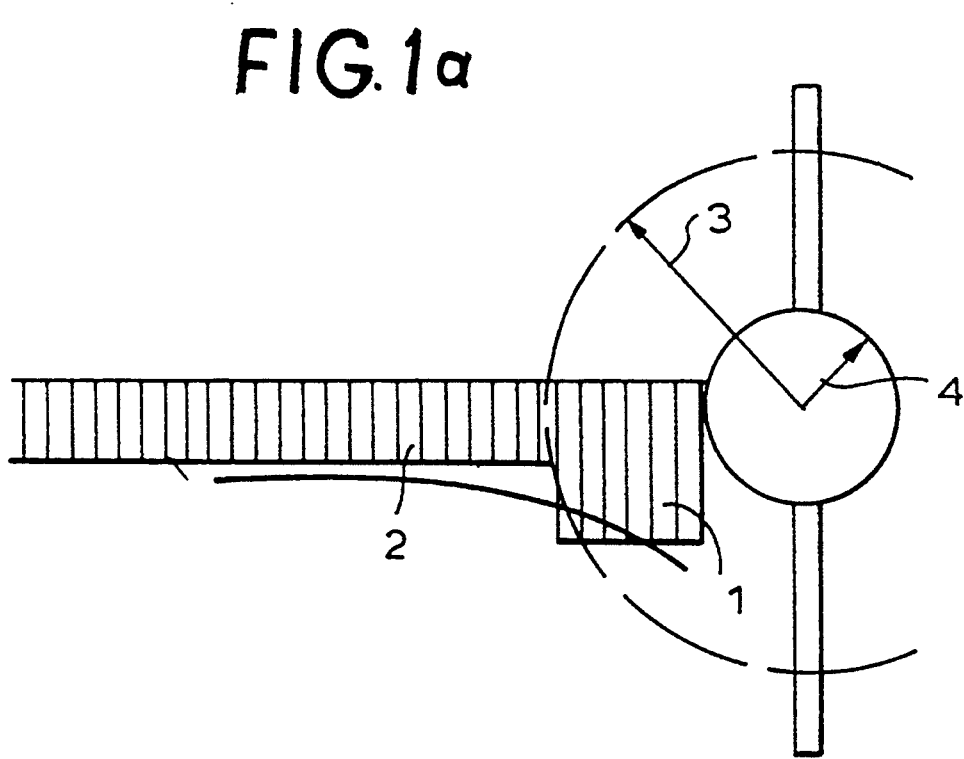

FIG. 1 shows that the tangential stresses developed in the productive seam near the well are monotonously reducing, but increasing during cutting of the slots. The permeability changes in accordance with the same principles, and in both cases approaches the permeability corresponding to the untouched mass. It has been proven experimentally that the value of permeability of the near well zone is approximately 0.15 mdarsi; after the slot loosening it is increased 4–5 times; for crack collectors it is increased 13–14 times. In other words, its values fluctuates 0.67–0.68 mdarsi, and with 0.05 mdarsi becomes equal to 0.67 mdarsi.

Figure 2:
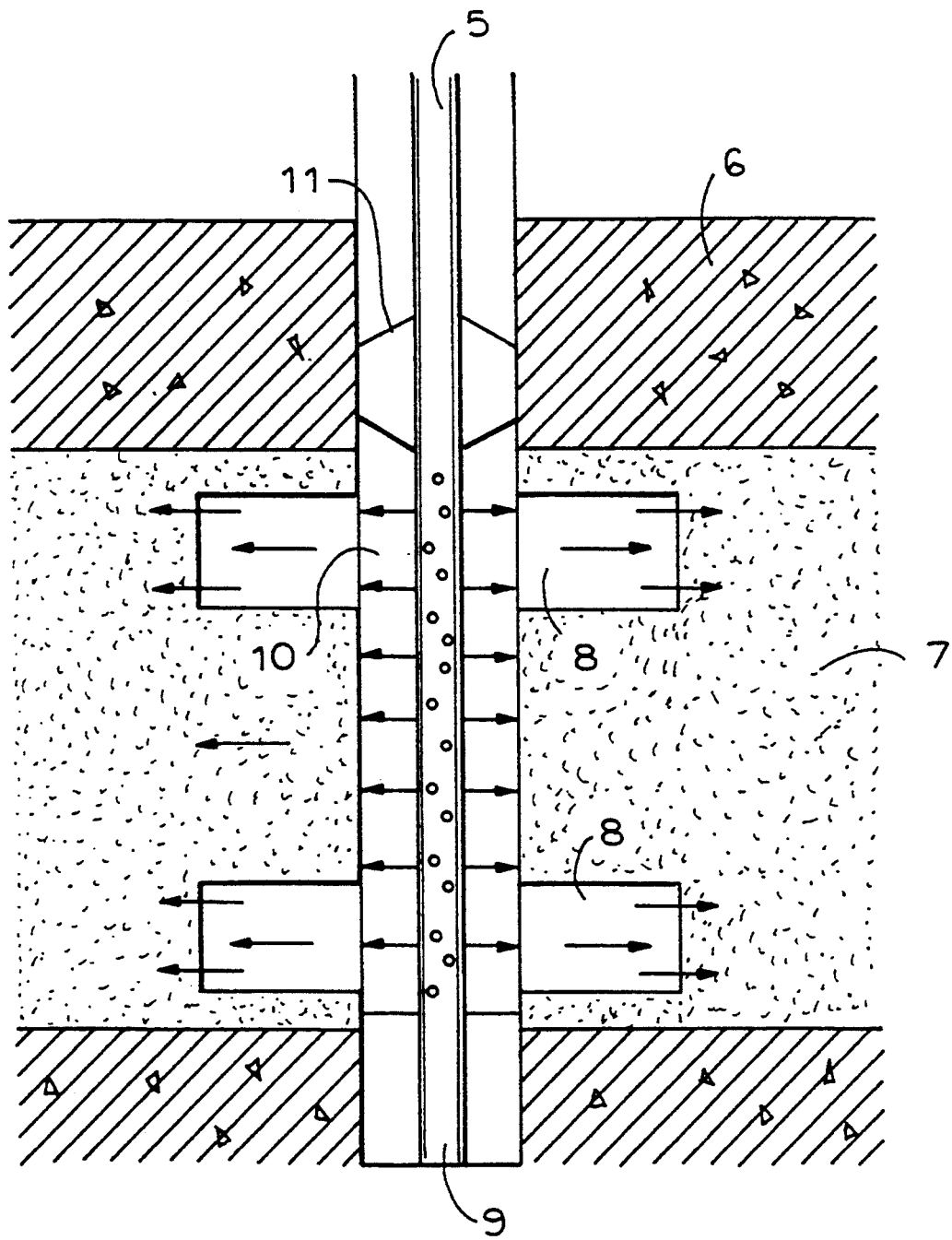
FIG. 2 illustrates treatment of a productive layer by a seam-forming liquid after slot forming in all low permeable intervals.
Figure 3:
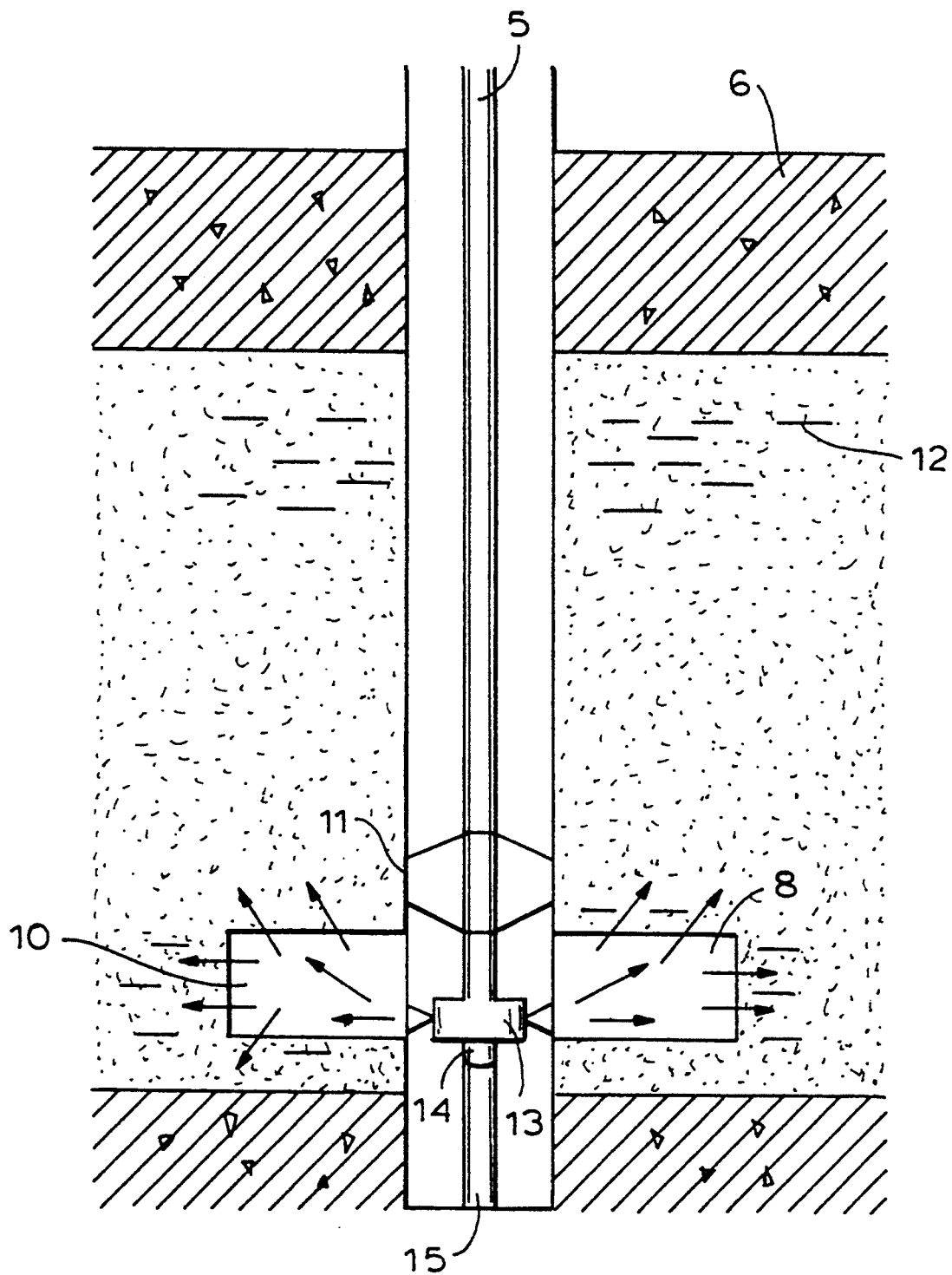

It is therefore to be understood that the slot loosening permits pumping of the seam-treating liquid into low permeable zones. During this process, it is guaranteed with the composite treatment that the seam-treating liquid will uniformly penentrate into all intervals of the seam, or in other words the whole productive seam will be intensified as shown in FIG. 2. However, when in the near well zone there is no layer system but instead a layered mass as a result of operation of the well or its formation, then the low permeable intervals are colmated, and the well operates practically only with high productive intervals. The formation of the slot in the low productivity zones with the treatment with seam-forming liquid of each zone as shown in FIGS. 3 and 4, involves them in the operation as well.

For performing the inventive method, the equipment which is usually utilized for hydrosand-blasting perforation is used. The underground equipment includes a hydro-sand-blasting perforator and a column of pump-compressor pipes For forming the slots any face engine, hydraulic jack and reciprocating mechanism can be used. The above ground equipment includes pump aggregates, a sand-mixing apparatus or a mixing cementing funnel, manifolds, filters, etc.

The said-liquid mixture required for cutting the slots is prepared in sand mixing apparatuses. The working, reserve, supply pump aggregates and sand-mixing apparatus are connected by the block of manifolds with inlet fittings mounted on the well. Filters for cleaning of circulating liquid-sand mixture are mounted in the pumping and return line.

The used abrasive material is sand with the grain size 0.20–1.0 mm and contents of quartz not less than 50%. When the liquid-carrier of sand is selected, physico-chemical properties of the seam and the fluids in it, as well as technological parameters of the process are taken into consideration.

Thus, the essence of the process is to involve the whole capacity of the productive seam in the well into operation (low productive intervals) by hydraulic washing out of the cavity with its subsequent development till establishment of connection with the untouched zone of the seam by the seam-treating liquid with activating components. The increase of inflow of seam fluids due to the increase of the radius of excavation (removal of stresses) and reduction of input hydraulic resistances is 50–80% of the initial value.

For example in the well of Chutimski deposit with opened productive seam in the interval 1318.4–1321.2: 1322.4–1324.4 m which started operation after being treated with the seam-treating liquid, the inflow was obtained only in the interval 1322.4–1324.4. In order to straighten the profile of receiving capacity of the well, the slot opening was performed in the interval of 1321.2–1318.4. Then, interval treatment with the seam-treating liquid which contained activating components, was performed. The pressure of pumping into the previously used interval was 45/40 atm, and into the non-used interval (1318.4–1321.2 m) was 30/20 atm., with equal volumes and time of pumping. The increase of inflow of oil was 330% (from 2.97 to 15.75 $m^3$ per 24 hours). From the experience of conventional treatment with seam-treating liquids it is known that the efficiency of repeated treatment with liquids was 10–50%. At the same time the use of slot loosening in analogous conditions provides the effect of approximately 30%. It is therefore clear that the inventive method increases the well productivity many times more than the total increase from the slot loosening and liquid treatment.

The examples presented hereinabove show that the operations which are required for the method, such as preparation of seam-treating liquids, admixing of additional ingredients with required concentration, saturation with gas, pumping of the liquid into the well, hydroperforation and formation of slots are well known in mining and other industries. They are used here in a conventional manner with a standard equipment. The new method has been tested in working conditions, and the results of experiments confirmed the advantages of the new method over the prior art. For example, the method in accordance with the first embodiment (the seam-treating liquid is an alkaline solution with addition of KOH and reactants KCl and $AlCl_3$) has been used in Polonezenski oil deposit with terigen collector with monmorillonited, kaolin and hydromica cements, and during treatment of the well produced the increase of the inflow from 7 $m^3$ per 24 hours to 20 $m^3$ per 24 hours, which changed a little only during certain time. During the treatment of 4 wells the method reduced the pressure from 450–500 atm to 180–200 atm. Their receiving capacity with this pressure was 20–40 $m^3$ per 24 hours, and they operate without additional measures more than half a year.

The experimental tests of the second and third embodiments (seam-treating liquid-saturated solution of sodium bicarbonate, artificially saturated with carbon dioxide), with hydroperforation by the seam-treating liquid mixed with sand, showed the increase of efficiency of slot opening by 20–25% and the increase of the size of channels of the rock in the shaft-adjacent zone 2–2.5 times.

The invention is not limited to the details shown since various modifications and structural changes are possible without departing in any way from the spirit of the present invention.

What is desired to be protected by Letters Patent is set forth in particular in the appended claims.

We claim:

1. A method of increasing oil well productivity, comprising the steps of activating a seam-treating liquid with activating compounds to prevent swelling and peptization of aluminous particles in a zone near a well by forming lines between particles; and cyclically treating a zone near a well with the seam-treating liquid activated with the activating components, said liquid being a low alkaline solution while said activating components are K+ which is a reactant causing a phase transition of third order in aluminous minerals of the group 2: 1 and polyvalent cations.

2. A method as defined in claim 1, and further comprising the step of controlling permeability of channels formed in the rock zone near the well during said treating.

3. A method as defined in claim 1, wherein said polyvalent cations are cations selected from the group consisting of $Al^{3+}$ and $Mg^{2+}$.

4. A method as defined in claim 1, and further comprising the steps of controlling permeability of channels formed in the rock zone near the well during the treating; and controlling a difference of concentration of pH and cations in the seam-treating liquid when it enters the well and when it exits the well.

5. A method as defined in claim 4; and further comprising the step of maintaining said difference of concentration not more than 5%.

6. A method of increasing oil well productivity, comprising the steps of activating a seam-treating liquid with activating compounds to prevent swelling and peptization of aluminous particles in a zone near a well by forming lines between particles;

cyclically treating a zone near a well with the seam-treating liquid activated with the activating components;

and slot forming of the well simultaneously with said treating, by said seam-treating liquid which operates as a working liquid for the slot forming.

7. A method of increasing oil well productivity, comprising the steps of activating a seam-treating liquid with activating compounds to prevent swelling and peptization of aluminous particles in a zone near a well by forming lines between particles;

cyclically treating a zone near a well with the seam-treating liquid activated with the activating components, said treating includes forming a pair of slots in the zone near the well.

8. A method as defined in claim 7; and further comprising forming a second pair of vertical slots located symmetrically relative to the well, oriented substantially perpendicular said first mentioned pair of slots, and having a depth equal to 20–50% of a depth of the slots of the first mentioned pair.

9. A method of increasing oil well productivity, comprising the steps of activating a seam-treating liquid with activating compounds to prevent swelling and peptization of aluminous particles in a zone near a well by forming lines between particles;

cyclically treating a zone near a well with the seam-treating liquid activating with the activating components;

and determining a direction of maximum stresses in the zone near the well, the major pair of slots is created in the direction normal to the maximum principal in situ stress direction.

10. A method of increasing oil well productivity, comprising the steps of forming in a zone near a well a pair of vertical slots located substantially opposite to one another and substantially parallel to a well bore, said forming including forming said slots so that they are located symmetrically relative to the well and diametrically opposite to one another.

11. A method as defined in claim 10, wherein said forming includes forming the pair of vertical slots having a length in a vertical direction equal to at least four diameters of the well bore and a width in horizontal direction equal to at least 15 mm.

12. A method of increasing oil well productivity, comprising the steps of forming in a zone near a well a pair of vertical slots located substantially opposite to one another and substantially parallel to a well bore; and forming a second pair of substantially vertical slots oriented substantially perpendicularly to the slots of the first pair of slots and having a depth in horizontal direction equal to substantially 20–50% of a depth of the slots of the first mentioned pair of slots.

13. A method of increasing oil well productivity, comprising the steps of forming in a zone near a well a pair of vertical slots located substantially opposite to one another and substantially parallel to a well bore; and determining a direction of maximum stresses in the zone near the well, said forming including forming said slots substantially perpendicular to the direction of maximum stresses.

14. A method of increasing oil well productivity, comprising the steps of forming in a zone near a well a pair of vertical slots located substantially opposite to one another and substantially parallel to a well bore; said forming including forming said slots by a seam treating liquid.

15. A method as defined in claim 14, wherein said forming includes forming said slots by the seam treating liquid which has been activated by activating components.

16. A method as defined in claim 15, wherein said liquid is a low alkaline solution while said activating components are $K+$ which is a reactant causing a phase transition of third order in aluminous minerals of the group 2:1 and polyvalent cations.

17. A method as defined in claim 16, wherein said polyvalent cations are cations selected from the group consisting of $Al^{3+}$ and $Mg^{2+}$.

* * * * *